United States Patent [19]
Benedicto Ruiz et al.

[11] Patent Number: 5,648,784
[45] Date of Patent: Jul. 15, 1997

[54] PROCEDURE FOR CONTROLLING A SCANNING ANTENNA

[75] Inventors: Francois-Xavier Benedicto Ruiz, Noordwijk; Mario Lopriore, Oegstgeest; Luigi Bella, Noordwijk aan Zee, all of Netherlands

[73] Assignee: Agence Spatiale Europeenne, Paris, France

[21] Appl. No.: 600,279

[22] Filed: Feb. 12, 1996

Related U.S. Application Data

[63] Continuation of Ser. No. 44,484, Apr. 9, 1993, abandoned.

[30] Foreign Application Priority Data

Apr. 9, 1992 [FR] France .................... 92 04343

[51] Int. Cl.$^6$ .................................... H01Q 3/22
[52] U.S. Cl. .................. 342/373; 342/372; 370/394; 370/431
[58] Field of Search ..................... 342/373, 372, 342/354, 377; 370/104.1, 97, 95.1, 95.3, 94.1, 94.2

[56] References Cited

U.S. PATENT DOCUMENTS

| | | |
|---|---|---|
| 4,188,578 | 2/1980 | Reudink et al. |
| 4,309,764 | 1/1982 | Acampora .................... 370/83 |
| 4,338,605 | 7/1982 | Mims .......................... 342/373 |
| 4,931,802 | 6/1990 | Annal et al. .................. 342/356 |
| 5,128,683 | 7/1992 | Freedman et al. ............. 342/158 |
| 5,301,194 | 4/1994 | Seta ........................... 370/95.1 |

OTHER PUBLICATIONS

IEEE Transactions on Communications, vol. 27, No. 10, Oct. 1979, pp. 1406–1415.

*Primary Examiner*—Thomas H. Tarcza
*Assistant Examiner*—Dao L. Phan
*Attorney, Agent, or Firm*—Sughrue, Mion, Zinn, Macpeak & Seas

[57] ABSTRACT

A procedure for control of a scanning antenna including:
- a central modulation-management unit (OBS) incorporating an external angular scanning and packet-synchronization bus (BRC),
- at least N modulation-control devices ($MOD_1, \ldots MOD_N$),
- at least one beam-forming device (BFN),
- at least one network comprising M antenna elements ($A_1, \ldots A_M$), the central management unit (OBS) incorporating N first terminals connected respectively to N second terminals of the beam-forming device (BFM) through the N modulation-control devices ($MOD_1, \ldots MOD_N$), and the beam-forming device (BFN) incorporating, on the one hand, M third terminals connected respectively to the M antenna elements respectively ($A_1, \ldots A_N$), and, on the other, a scanning and synchronization terminal connected to the external bus (BRC). Scanning is effected by aiming the beam in different preferred directions at the packet rate of a multiplex, so as to address the packets in the directions and to ensure continuity of synchronization.

17 Claims, 5 Drawing Sheets

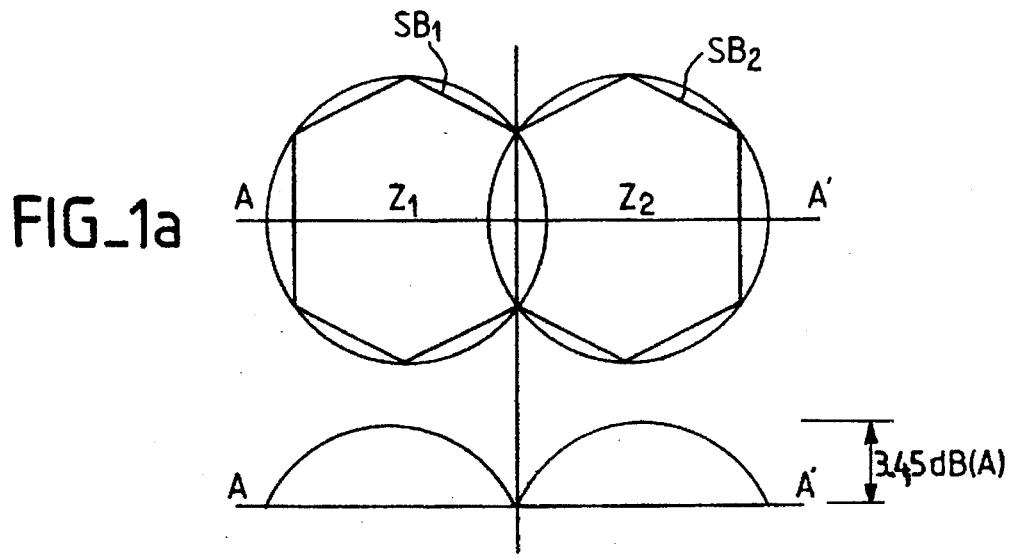
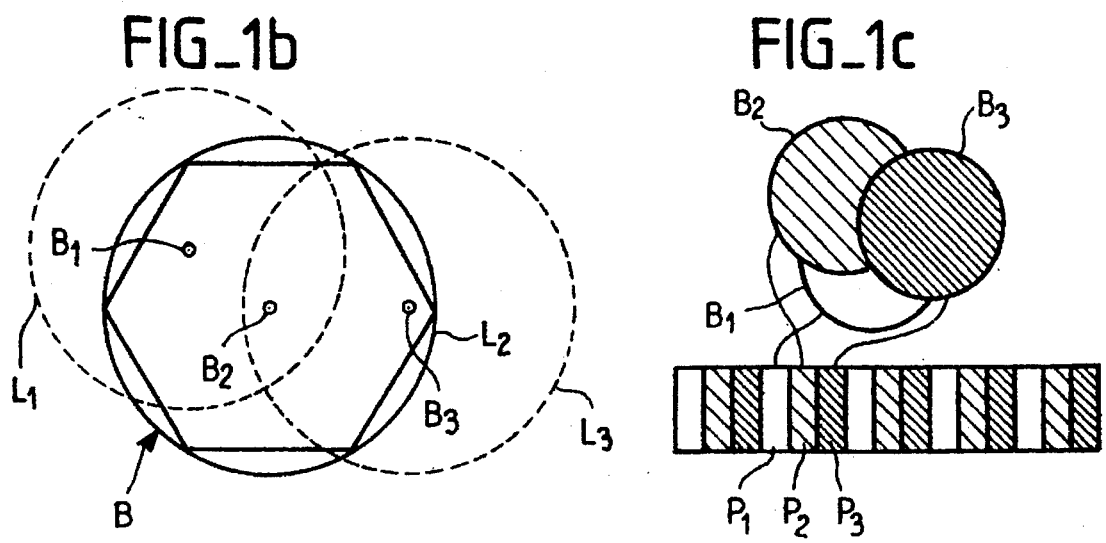
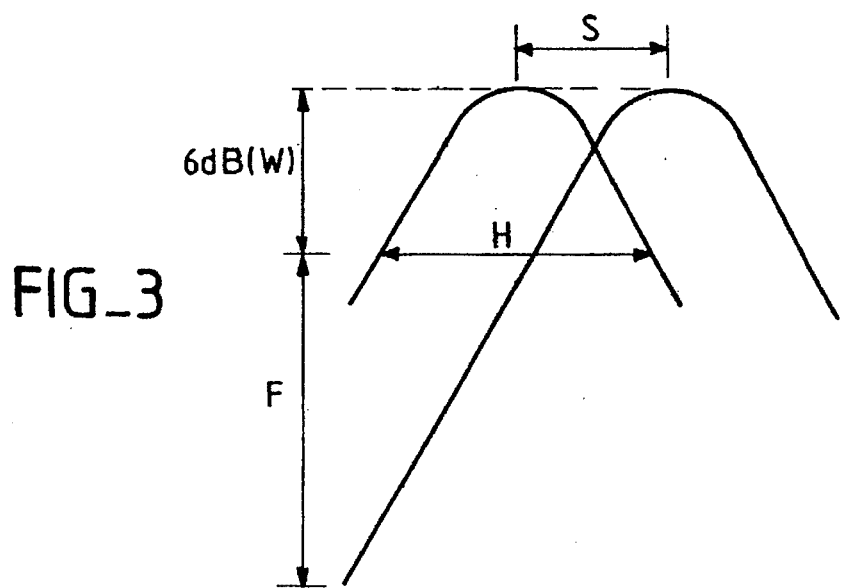

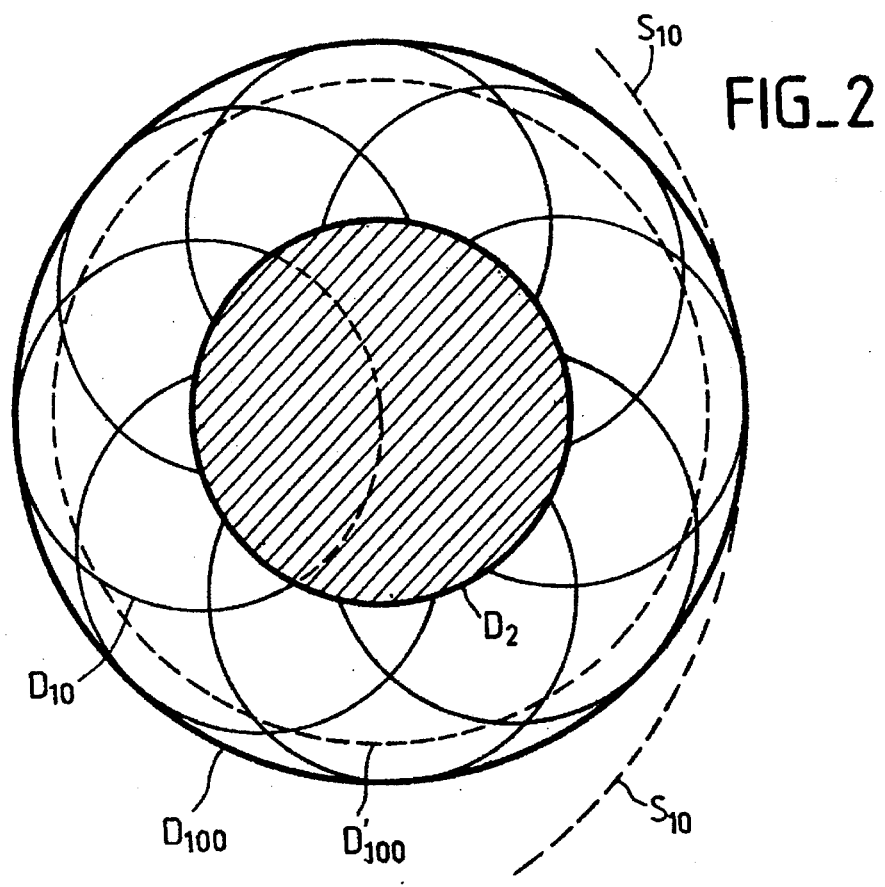
FIG_2
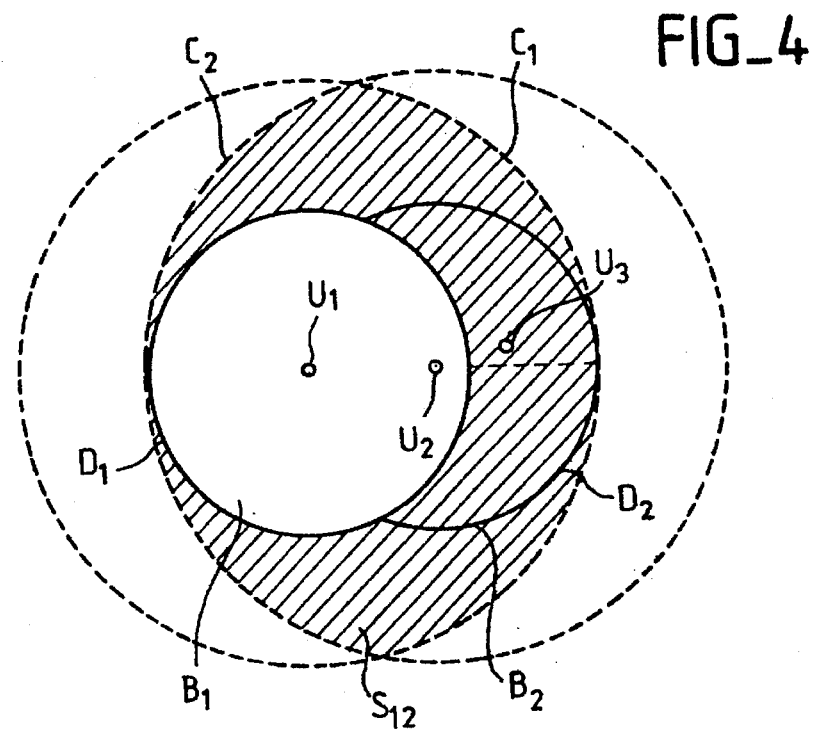
FIG_4

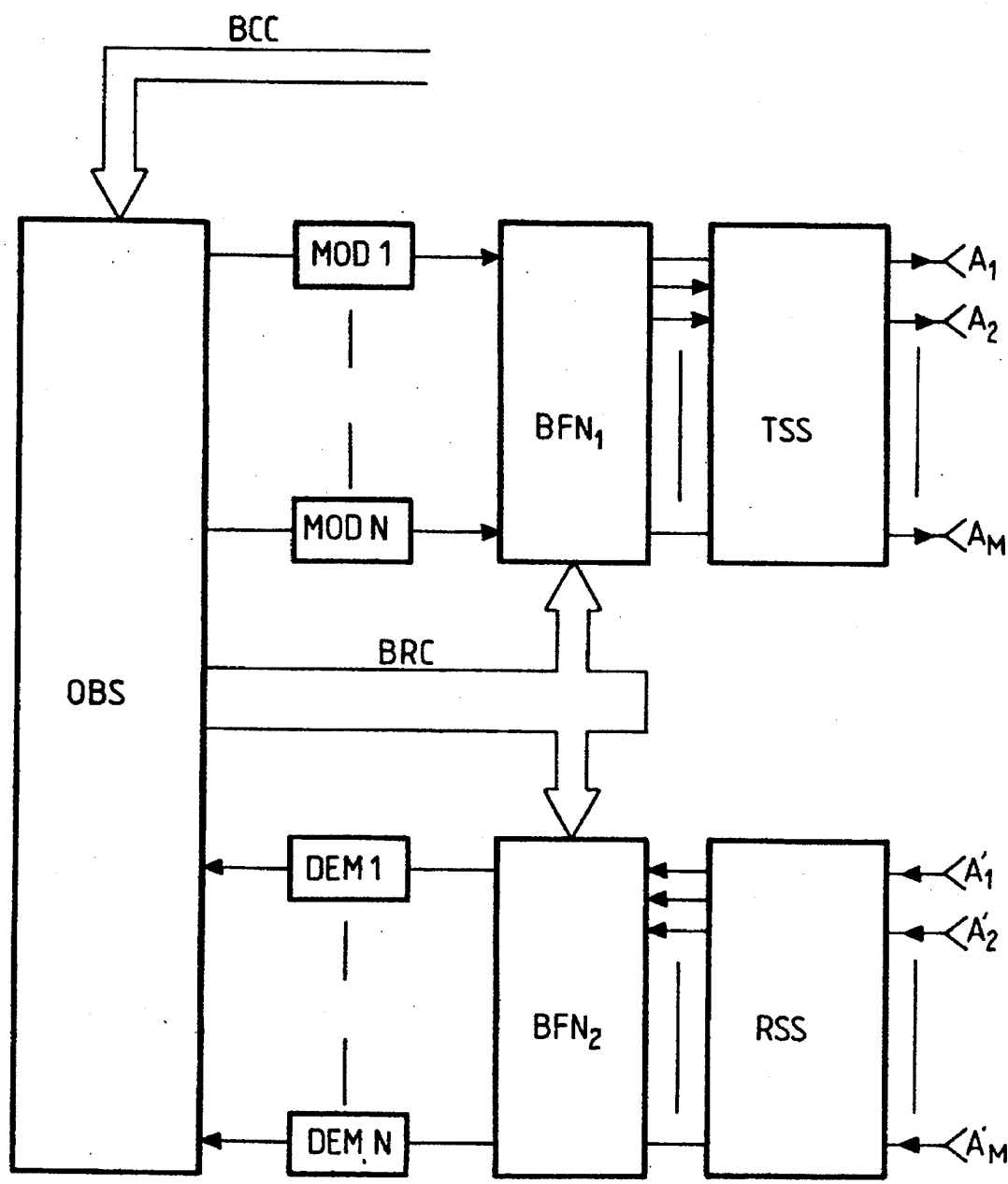
FIG_5

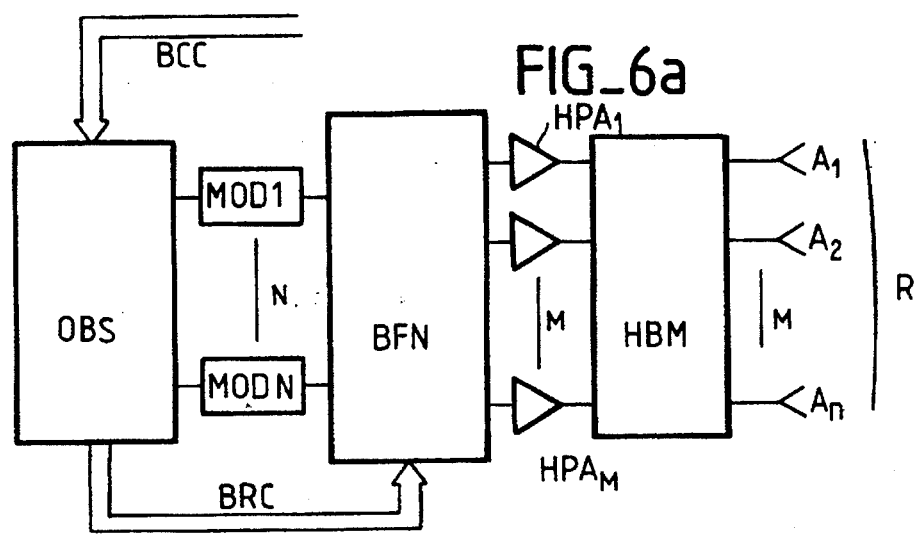
FIG_6a
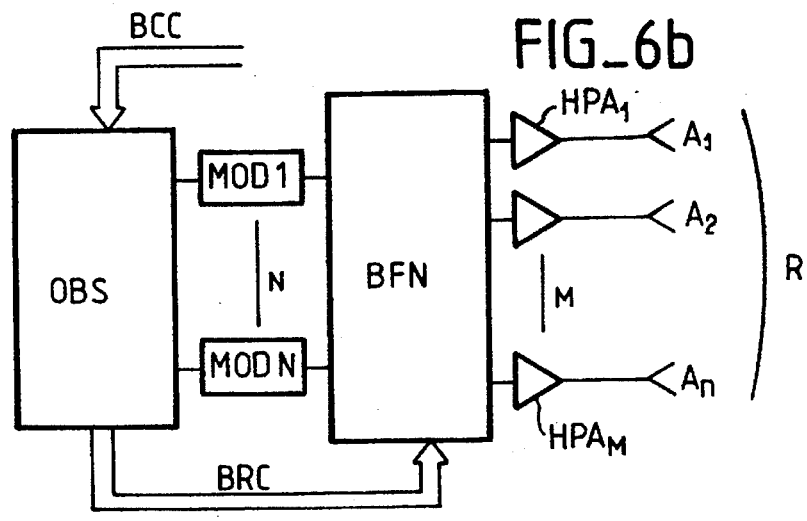
FIG_6b
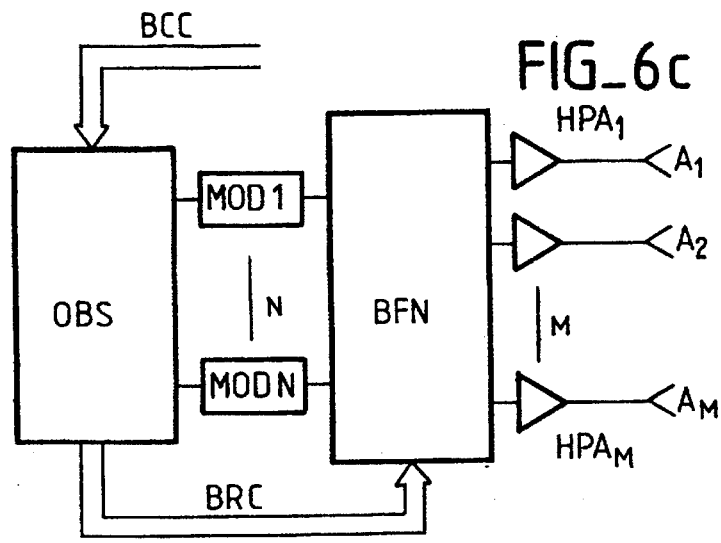
FIG_6c

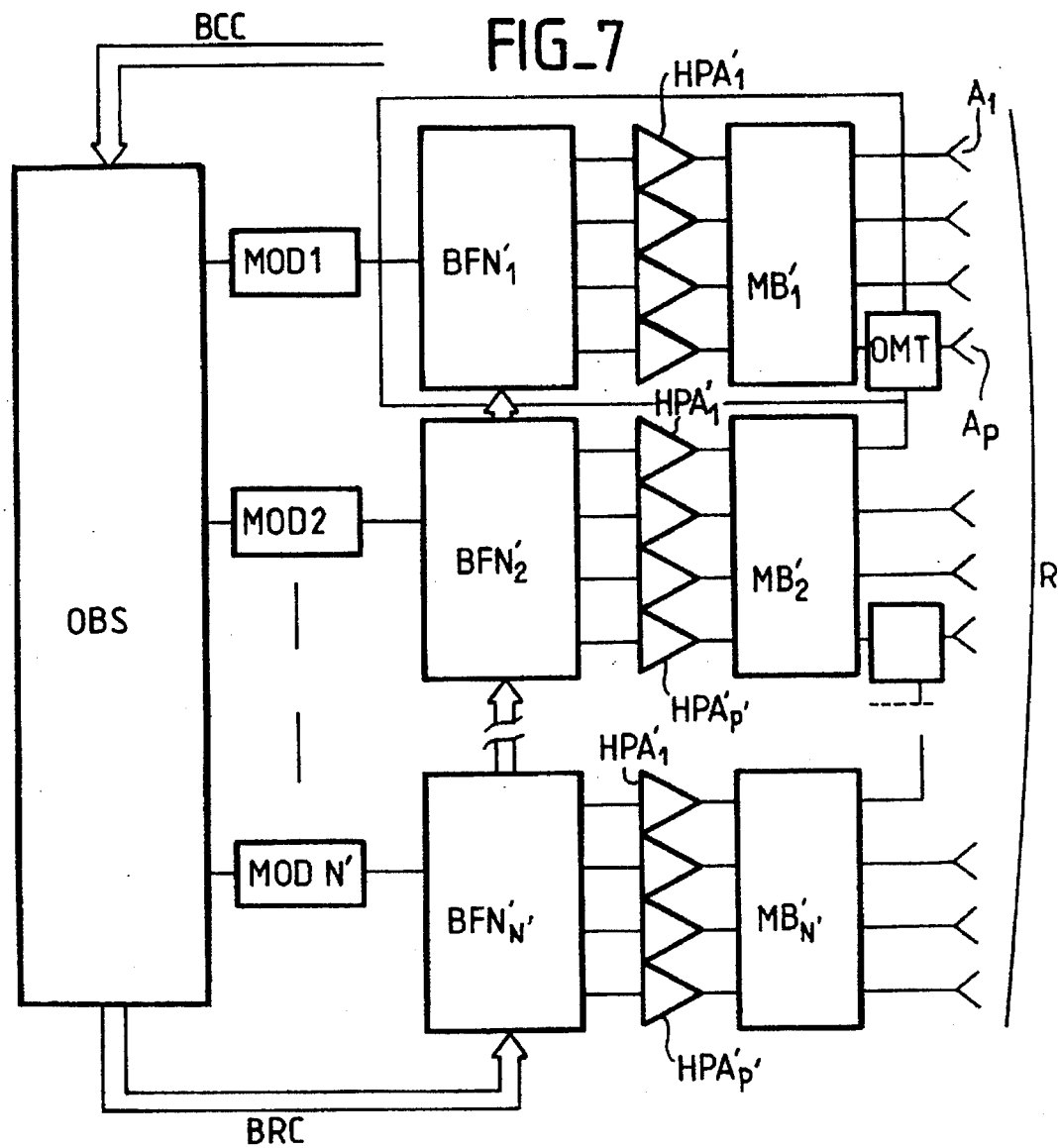
FIG_7
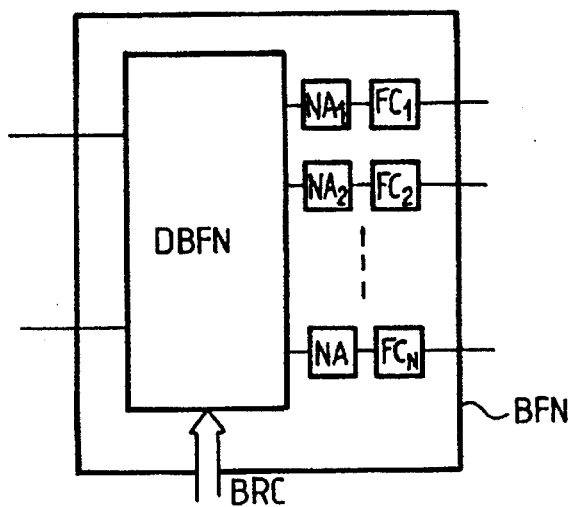
FIG_8

PROCEDURE FOR CONTROLLING A
SCANNING ANTENNA

This is a continuation of application Ser. No. 08/044,484 filed Apr. 9, 1993 now abandoned.

BACKGROUND OF THE INVENTION

1. Field of the Invention

The present invention concerns a procedure for controlling a scanning antenna, in order to transmit and/or receive at least one beam in a given tracking direction.

2. Description of the Background Art

Satellite-transmission networks for stationary ground users have been designed for creating telecommunications systems producing medium or high data rates, while meeting the following criteria:

- use of small ground terminals (V.SAT);
- high total capacity of the system;
- high degree of efficacy of the radio-frequency-conversion device on board the satellite;
- dynamic allocation of the resource.

These criteria entail complex compromises between the design of the multi-beam antenna, the transmission subsystem, and the switching and processing subsystem.

A number of known solutions yielding improved design of these systems include, in particular:

- coverage of the service zone by a plurality of beams, e.g., between six and twelve beams for Europe,
- increased capacity of the system by reuse of frequencies, through implementation of different linear polarizations,
- establishment of a variable capacity by using one or several temporal multiplexes per beam, although, in this case, granularity is weak, and
- time division multiple accesses (TDMA) to avoid blockage of the up-link.

One solution also proposed involves the beam-jump technique, in which different packets of a temporal multiplex can be channelled to different beams, instead of being addressed continuously to a single beam. The disadvantage of this technique is that, in this instance, the link to the ground receiver becomes a link of the temporary division multiple access TDMA type (in contradistinction to a temporal multiplex TDM link), because of the fact that ground users work in the pulsed, and not the continuous, mode. This implies the use of more complicated demodulators and, furthermore, a reduction of the efficacy of the frame, since signalling flags must be added at the top of the frame to allow synchronization acquisition by the receiver.

Moreover, all of the aforementioned solutions presuppose the availability of fixed, predetermined beam positions, which overlap with a degree of overlapping of between 3 and 4.5 dB for most antennae. The required on-board radio/frequency RF power is determined by user demand in the EOC border coverage zones which "see" the lowest satellite antenna gain. The result is a loss of system output. Another output loss results from the granularity problem, i.e., the price which must be paid in power in order to increase the capacity of a beam by a quantity less than the transmission rate of a temporal multiplex.

In addition, a temporal multiple access (TDMA) implementing an antenna using multiple beams, each of which scans one dimension, has been described in the article of Anthony S. Acampora et al., in *IEEE TRansactions on Communication* Vol. COM27 No. 10, October 1979, entitled "A Satellite System with Limited Scan Spot Beams." In this system, each of the different beams scans parallel lines, and the beams are mutually isolated while alternating their polarizations. This system, of complicated design, allows coverage of a very large surface-area (all of the United States) using a relatively small number of beams, but at the cost of restricting very significantly accessibility to the device by ground receiving stations, because of the dilution of the time of access available to these stations resulting from scanning of lines of large amplitude.

SUMMARY OF THE INVENTION

The instant invention concerns a procedure and a device which facilitate the design of systems utilizing antennae, in particular multi-beam antennae.

The instant invention also concerns a method for control of a scanning antenna so as to transmit and/or receive at least one beam in a tracking direction and encompassing a nominal zone of coverage centered on this tracking direction, this method being characterized by the fact that it comprises the steps of synchronizing scanning with data packets transmitted and/or received by the antenna and of aiming the beam sequentially in synchronism with at least some of the packets in preferred directions of transmission and/or reception of said packets, the nominal zones of coverage of the different preferred directions intersecting at least partially so as to delimit a nominal synchronization zone, in such a way that:

a) any point of the nominal synchronization zone can receive packets transmitted by the antenna when this point is located in a nominal coverage zone lying in at least one preferred direction and can ensure continuity of packet synchronization at reception when said point is not situated in one of said zones; and/or b) for any point of transmission located in the nominal synchronization zone, the antenna is capable of receiving packets transmitted by said point of transmission when it is located in a nominal coverage zone lying in at least one preferred direction and can ensure continuity of said packet synchronization at reception when said point of transmission is not located in one of said zones.

By implementing this method, it is possible to achieve the remarkable result that a continuous temporal multiplex operating mode is maintained, while addressing sequentially to the different users the packets intended for them, in order to allow reception by users with a maximum satellite antenna gain.

Scanning may be implemented around a central nominal direction of the beam, so that the shape of the nominal synchronization zone possesses circular symmetry.

According to a preferred embodiment, said scanning is effected within two laterally-offset contours, so that the nominal synchronization zone is elongated in shape and lies in a substantially longitudinal direction.

According to a variant, the invention concerns a method for control of a scanning antenna in order to transmit and/or receive at least one beam in a tracking direction, said beam exhibiting a nominal coverage zone centered on the tracking direction, said method being characterized by the fact that it comprises the steps of synchronizing scanning using data packets from the antenna and of aiming the beam sequentially in synchronism with at least some of the packets in preferred directions of transmission and/or reception of said packets, at least one first transmission and/or receiving device being located in a first nominal coverage zone corresponding to a first preferred tracking direction, at least one second transmission and/or reception device being located in a second nominal coverage zone corresponding to a second preferred tracking direction, the first and second preferred tracking directions being chosen so that, when the antenna is aimed, respectively, in the first or second preferred tracking direction, said first or second device is located, respectively, in a first or second nominal synchronization zone in which continuity of the synchronization of the packets can be ensured between the antenna and the second or first device, respectively, The invention also relates to a communications network comprising a satellite incorporating a scanning antenna for transmission and/or reception of at least one beam in a tracking direction and encompassing a nominal coverage zone centered on this tracking direction, this network being characterized by the fact that it comprises a mechanism for synchronizing scanning using data packets from the antenna, a switching mechanism designed to aim the beam sequentially in synchronism with at least some of the packets in a plurality of preferred directions of transmission and/or reception of said packets, the nominal coverage zones of the different preferred directions overlapping at least partially so as to delimit a nominal synchronization zone in such a way that:

a) any point of the nominal synchronization zone can receive packets transmitted by the antenna when this point is located in a nominal coverage zone lying in at least one preferred direction and can ensure continuity of packet synchronization at reception when said point is not situated in one of said zones; and/or b) for any point of transmission located in the nominal synchronization zone, the antenna is capable of receiving packets transmitted by said point of transmission when it is located in a nominal coverage zone lying in at least one preferred direction and can ensure continuity of said packet synchronization at reception when said point of transmission is not located in one of said zones.

According to a variant, the invention relates to a communications network consisting of a satellite incorporating a scanning antenna in order to transmit and/or receive at least one beam in a tracking direction and encompassing a nominal coverage zone centered on the tracking direction, this network being characterized by the fact that it includes a mechanism for synchronizing scanning using data packets from the antenna, a switching mechanism designed to aim the beam sequentially in synchronism with at least some of the packets in a plurality of preferred directions of transmission and/or reception of said packets, a plurality of ground transmission and/or reception devices capable of being positioned in one of the nominal zones of coverage of the plurality of preferred directions, said preferred directions being chosen in such a way that any transmitter out of the multiplicity of transmitters can provide for continuity of synchronization of packets transmitted by the antenna and/or that the antenna can ensure continuity of the synchronization of packets transmitted by each of the transmitters in the group thereof.

The invention also concerns an implementing device as described above and characterized by the fact that it consists of:

a central modulation-management unit incorporating an external angular scanning and packet-synchronization bus, at least N modulation-control devices, at least one beam-forming device, at least one network comprising M antenna elements, the central management unit incorporating N first terminals connected respectively to N second terminals of the beam-forming device through said N modulation-control devices, and the beam-forming device incorporating, on the one hand, M third terminals connected respectively to said M antenna elements, and, on the other, a scanning and synchronization terminal connected to said external bus.

The beam-forming device may comprise a wide-band, high-speed beam-forming network incorporating a Butler half-matrix which connects this beam-forming network to the M antenna elements.

According to a preferred embodiment, the device is characterized by the fact that it comprises:

a central modulation-management unit containing an external packet-synchronization bus, M' groups of elements in series, each comprising a modulation-control device, a beam-forming device, a power amplifier, a Butler matrix, and a sub-group of P antenna elements, each modulation-control device having a terminal connected to a terminal on the central management unit, and each beam-forming device having a scanning/synchronization terminal connected to said external bus, and by the fact that it comprises a reflector working in conjunction with the N' sub-groups of P antenna elements in order to produce focused scanning.

This device is particularly advantageous because it enables the amplifiers to function in the saturation mode by means of a single temporal multiplex carrier.

BRIEF DESCRIPTION OF THE DRAWING FIGURES

Other features and advantages of the invention will emerge from a reading of the following description provided as non-limiting example and with reference to the attached drawings, in which:

FIG. 1a illustrates a system according to prior art incorporating stationary beams creating a zone of overlap;

FIG. 1b and 1c illustrate the procedure according to the invention, which utilizes synchronized sequential scanning with the packets of a multiplex;

FIG. 2 illustrates the extension of the coverage zone according to a first embodiment of the invention;

FIG. 3 represents the dynamics available at the edge of the coverage area using the scanning procedure according to the invention;

FIG. 4 illustrates the extended coverage zone in the case of scanning according to a preferred embodiment of the invention;

FIG. 5 represents a transmission/reception device according to an embodiment of the invention;

FIGS. 6a, 6b, and 6c show variants of the device according to the invention, with a reflector in FIGS. 6a and 6b and a direct transmission antenna in FIG. 6c;

FIG. 7 illustrates a device according to a preferred embodiment of the invention; and

DESCRIPTION OF THE PREFERRED EMBODIMENTS

FIG. 1a represents two adjacent services zones Z1 and Z2 covered conventionally by two adjacent, stationary beams SB1 and SB2 which partially intersect. The lower part of FIG. 1a shows, lying in direction A', the variations in power gain in the zones of coverage. In practice, these variations occur within a range of approximately 3 to 4.5 dB (P).

As shown in FIGS. 1b and 1c, a beam B is directed in alternating fashion in three directions B1, B2, and B3, in synchronism with packets which must be transmitted in the three corresponding preferred directions. FIG. 1c illustrates the allocation of the successive packets (or groups of packets) P1, P2, and P3 of a temporal multiplex among the three different positions B1, B2, and B3, successively, of the beam B.

To obtain continuous operation of the temporal multiplex demodulators belonging to the ground receivers, the maximum scanning limit of the beam must always ensure a signal-to-noise ratio sufficient to guarantee that none of the users of the different service zones lose the synchronism of their demodulators.

There follows below an analysis making it possible to quantify radio-frequency RF power and the expansion of the coverage area resulting from the technique of sequential scanning of users of the UHA system (access by user jump), which makes it possible to maintain operation in the temporal multiplex TDM mode.

The ability to save radio-frequency RF power depends on two factors: (1) the capacity of the antenna to maintain scanning in the service zone with the same maximal gain, and (2) the dynamic range of the link, which enables the demodulator of a ground receiver to maintain synchronism when the level of the radio-frequency signal received is weaker. This attenuation of the signal results from the fact that the temporal modulation multiplex TDM beam is aimed, at least for certain packets belonging to a frame, in a direction different from the one in which the user is positioned, in order to address corresponding packets to another user located in a different region.

FIG. 3 illustrates a maximum dynamic range for a user at the edge of a zone of coverage, when the beam is shifted from tracking in relation to him. The maximum tracking angle S between two adjacent zones may thus be determined in the following way:

$$S = H \times (\sqrt{F/12} - 0.5),$$

where

F=maximum dynamic range in the service zone at dB(P),

H=the width of the beam (in degrees) at half-power (or at −6 dB(P) of the maximum level).

If the maximum available dynamic restricts the value of the angle S so as to be less than the width of overlap of the beam, as shown in FIG. 3, the technique according to the invention will introduce several variations into the coverage of the gain, but this variation will be smaller than that of a static beam. The following table illustrates the values of S and the value RFPS of the radio-frequency power saving for dynamic ranges of 3, 6, 10, and 15 dB(P), respectively:

TABLE 1

| F (dB) | S/H | RFPS (dB) |
|---|---|---|
| 3 | 0 | 0 |
| 6 | 0.2 | 2 |
| 10 | 0.4 | 2.9 |
| 15 | 0.6 | 4.6 |

It will be noted that the value of RFPS cannot normally exceed the loss of gain at the edge of the coverage limit normally ranging between 3 and 4.5 dB(P) (see FIG. 1a).

As previously mentioned, the radio-frequency power saving may be used to lower the antenna gain, i.e., to reduce the size of the satellite antenna, and, consequently, the number of elementary beams required to cover the service area.

The technique of dynamic scanning of UHA users also improves scanning flexibility by increasing the area of overlap between adjacent beams, as shown in FIG. 2. By incorporation of a number of circular coverage zones $D_{10}$ around a central position $D_2$, the total coverage zone is a circular contour of greater diameter $D_{100}$. To maintain synchronization at all points, the contour $D_{100}$ must be held inscribed within each of the synchronization contours, e.g., $D_{10}$ for the tracking direction corresponding to the coverage zone $D_{10}$. If this condition is not met, the effective nominal zone of synchronization will be a circle $D'_{100}$ having a diameter smaller than $D_{100}$.

FIG. 4 represents different degree of overlap of beams, in two different cases of maximum beam scanning. The extended zone $S_{12}$ of beam coverage is not circular, but results from the intersection of two circles $C_1$ and $C_2$, which set the limiting scanning conditions and are tangent to a nominal beam $B_1$ for a user $U_1$, and a beam $B_2$ shifted from tracking line so as to cover, for example, an additional user $U_2$ at the limit of coverage of $B_1$ and/or a user $U_3$ outside of the zone of coverage of $B_1$. The expansion ratio of the zone of coverage CER (oval zone in relation to the nominal zone of coverage Z1 of a stationary beam) has been computed for purposes of example for different values of the maximum dynamic range F.

TABLE 2

| F (dB) | CER |
|---|---|
| 3 | 1 |
| 6 | 1.4 |
| 10 | 2.2 |
| 15 | 3.3 |

The figures given above were calculated under the assumption that the additional user in FIG. 4 receives the signal attenuated by 3 dB(P) in relation to maximal gain. For a more sizable loss of gain, higher values of the CER parameter could be found.

The increase of the zone of coverage could also be used advantageously to reduce the probability of system blockage, or else to use the radio-frequency power saved to address additional traffic, thus leading to improved granularity.

If it is supposed that all additional traffic can be managed by overlapping of beams, as mentioned above, but that this traffic represents up to 33% of the total capacity of the system, the radio-frequency power saving would, in that case, be 2.2 dB for a six-beam system, and 4.2 dB for a twelve-beam system.

It will be noted, finally, that the technique involving sequential dynamic scanning of users, as described above, makes it possible to compensate for losses resulting from problems of aiming the beams. These losses can exceed 2 dB for a gain at the coverage limit (EDC) of approximately 35–40 dBi. These losses can be compensated for by correcting the tracking of the beams as a function of satellite attitude.

As shown in FIG. 5, a transmission/reception device placed on board a satellite comprises a central unit OBS which receives control data from the ground by means of a bus BCC. A group of transmission antenna elements $A_1$, $A_2$, ... $A_M$ is controlled by the central unit OBS by means of N modulators arranged in parallel and referenced as $MOD_1$, .

... $MOD_N$, which actuate a beam-forming network BFN whose output signals are applied to the inputs of a transmission subsystem TSS, whose outputs are connected to the aforementioned antenna elements $A_1, A_2, \ldots A_M$. The beam-forming network BFN is synchronized by a bus BRC deriving from the central unit OBS, which makes it possible to synchronize the BFN network to the rate of the transmitted temporal multiplexing TDM packets. The bus BRC also contains phase-shift data for variable phase-shift circuits belonging to the network BFN, so as to vary the angular orientation of the beam at the rate of the packets transmitted. The control signals have a bit rate equal to that of the TDM packets. The active antennae which perform scanning functions are well known in the prior art, e.g., in French Patent Application No. 89 12584 filed Sep. 26, 1989 by Applicant, in French Patent Application No. FR-1 527 939, in American Patent No. U.S. Pat. No. 4,901,085, or in American Patent No. U.S. Pat No. 3 731 315 (SHELEG).

In the configuration shown in FIG. 5, the N modulators $MOD_1 \ldots MOD_N$ send in parallel to the beam-forming networks BFN the N temporal modulations which the beam-forming network BFN is then capable of routing in the preferred directions, as indicated above. Reception is made symmetrical by means of reception antenna elements $A'_1, A'_2, \ldots A'_M$ whose signals actuate a reception subsystem RSS, a beam-forming network BFN identical to the aforementioned network but operating in the reverse direction, and N demodulators $DEM_1, \ldots DEM_N$, whose outputs are connected to the central unit OBS. Of course, the number of antenna elements may be different at transmission and reception.

FIGS. 6a to 6c illustrate variants of FIG. 5, in which only the transmission systems have been represented, that in FIG. 6a having a reflector antenna R, the transmission system TSS being a Butler half-matrix HBM which is actuated by M power amplifiers $HPA_1, \ldots HPA_N$.

In FIG. 6b, a beam-forming device BFN, whose inputs are connected to the outputs of the modulators $MOD_1, \ldots MOD_N$, comprises outlets which actuate the power amplifiers $HPA_1, \ldots HPA_M$.

FIG. 6c has a structure identical to that in FIG. 6b, but without a reflector.

The beam-forming device BFN (FIG. 5, 6a–6c) may be of the wide-band, high-speed type. A wide band allows operation with transmission signals in wide-band temporal TDM modulation, and high speed allows retracking of the beam at multiples of the frame rate in continuous TDM mode. Since each receiver operates in the continuous TDM mode, it thus becomes possible to operate in the time share mode between the different receivers, without using simultaneously a number of beams equal to the number of users on the ground. Moreover, each of these beams should have had a relatively large and variable passband to be able to process users at medium or high data rates (from 60 thousand bits/s to several millions of bits/s).

According to one embodiment, analog microwave circuits instead of digital beam-forming devices are implemented using the MMIC technique. Ultra high frequency beam-forming circuits can function at the highest TDM frame rates (approximately one microsecond).

As shown in FIG. 7, each modulator $MOD_1, MOD_2, \ldots MOD_N$ feeds its own beam-forming network $BFN'_1, BFN'_2, BFN'_N$, each of which actuates a plurality of power amplifiers $HPA'_1, HPA'_P$, whose outputs are connected to P-type Butler matrices $MB'_1, MB'_2, \ldots MB'_N$. Moreover, the OMT circuits allow reversal of the polarization of the adjacent antenna groups.

As illustrated in FIG. 8, the beam-forming networks BFN FIGS. 6a to 6c and 7 incorporate a digital beam-forming network DBFN controlled by the bus BRC. The M amplifiers $HPA_1, \ldots HPA_M$ (or the P' amplifiers in the case of FIG. 7) are supplied by the digital network DBFN by means of digital-analog converters $NA_1, \ldots NA_M$ and up converters $FC_1, \ldots FC_M$. Similarly, for reception, down converters (FC) and analog-digital converters AN downstream from the low noise amplifiers belonging to the subsystem RSS in order to feed the network $FBN_2$ (FIG. 5) and digital demodulators $DEM_1, \ldots DEM_N$ (sic).

Generally speaking, the beam-forming networks BFN may be analog or digital. The principle remains the same in both cases: i.e., multiply the signal vector by weighting factors. The choice of one or the other technique is a function of the application contemplated and of the level of technology. It is currently preferable to use analog networks, because of their wide passband, their switching speed, and, above all, their low level of consumption. This network BFN, although analog, incorporates an interface circuit which decodes the digital control signals and, in consequence, controls the analog phase-shifters.

We claim:

1. A procedure for controlling a scanning antenna which transmits or receives at least one beam in a tracking direction of said scanning antenna, wherein said beam encompasses a particular nominal coverage zone centered on said tracking direction, wherein said particular nominal coverage zone is one of a plurality of nominal coverage zones, and wherein said procedure comprises the steps of:

synchronizing a scanning operation of said scanning antenna with data packets transmitted or received by said scanning antenna; and aiming said beam sequentially in different directions of transmission or reception of said data packets, wherein said beam is aimed in synchronism with said transmission or reception of at least some of said data packets, wherein said nominal coverage zones correspond to said different directions and at least partially intersect so as to define a nominal synchronization zone in such a way that:

a) any receiving station in said nominal synchronization zone can receive said at least some of said data packets transmitted by said scanning antenna when said any receiving station is located in said particular nominal coverage zone and such that synchronization between said any receiving station and said reception of said at least some of said data packets is maintained when said any receiving station is located in said nominal synchronization zone but is not receiving said at least some of said data packets; or b) any transmitting station, which is located in said nominal synchronization zone, is capable of transmitting said at least some of said data packets to said scanning antenna and said scanning antenna is capable of receiving said at least some of said data packets transmitted by said any transmitting station when said any transmitting station is located in said particular nominal coverage zone and such that synchronization between said any transmitting station and said transmission of said at least some of said data packets is maintained when said any transmitting station is located in said nominal synchronization zone but is not transmitting said at least some of said data packets.

2. The procedure according to claim 1, wherein said scanning operation is effected around a nominal central direction of said beam so that said nominal synchronization zone possesses circular symmetry.

3. The procedure according to claim 1, wherein said scanning operation is performed within two contours laterally offset so that said nominal synchronization zone is substantially elongated longitudinally.

4. The procedure according to claim 1, wherein an angle of tracking shift of said beam between two nominal coverage zones is not greater than $H\times((F/12)^{1/2}-0.5)$, wherein $F=$ a maximum dynamic range in dB(P) and $H=$ a width of said beam (in degrees) at medium power.

5. A procedure for controlling a scanning antenna which transmits or receives at least one beam in a tracking direction of said scanning antenna, wherein said beam encompasses a particular nominal coverage zone centered on said tracking direction, wherein said particular nominal coverage zone is one of a plurality of nominal coverage zones, and wherein said procedure comprises the steps of:

synchronizing a scanning operation of said scanning antenna with data packets transmitted or received by said scanning antenna; and aiming said beam sequentially in different directions of transmission or reception of said data packets, wherein said beam is aimed in synchronism with said transmission or reception of at least some of said data packets, wherein at least one first transmission or receiving device is located in a first nominal coverage zone in a first tracking direction and at least one second transmission or receiving device is located in a second nominal coverage zone in a second tracking direction, wherein said first and second tracking directions are chosen so that:

when said scanning antenna is aimed in said first tracking direction, said second transmission or receiving device is located in a first nominal synchronization zone in which continuity of the synchronism of said at least some of said data packets is ensured between said scanning antenna and said second transmission or receiving device, and when said scanning antenna is aimed in said second tracking direction, said first transmission or receiving device is located in a second nominal synchronization zone in which continuity of the synchronism of said at least some of said data packets is ensured between said scanning antenna and said first transmission or receiving device.

6. A communication network comprising:

a satellite having a scanning antenna for transmission and/or reception of at least one beam in a tracking direction of said scanning antenna and exhibiting a particular nominal coverage zone centered on said tracking direction, wherein said particular nominal coverage zone is one of a plurality of nominal coverage zones;

a mechanism for synchronizing a scanning operation of said scanning antenna with data packets transmitted or received by said scanning antenna; and a switching mechanism designed to aim said beam sequentially in a plurality of different directions of transmission or reception of said data packets, wherein said beam is aimed in synchronism with said transmission or reception of at least some of said data packets, wherein said nominal coverage zones correspond to said different directions and at least partially overlap so as to define a nominal synchronization zone in such a way that:

a) any receiving station of said nominal synchronization zone can receive said at least some of said data packets transmitted by said scanning antenna when said any receiving station is located in said particular nominal coverage zone and such that synchronization between said any receiving station and said reception of said at least some of said data packets is maintained when said any receiving station is located in said nominal synchronization zone but is not receiving said at least some of said data packets; or b) any transmitting station, which is located in said nominal synchronization zone, is capable of transmitting said at least some of said data packets to said scanning antenna, and said scanning antenna is capable of receiving said at least some of said data packets transmitted by said any transmitting station when said any transmitting station is located in said particular nominal coverage zone and such that synchronization between said any transmitting station and said transmission of said at least some of said data packets is maintained when said any transmitting station is located in said nominal synchronization zone but is not transmitting said at least some of said data packets.

7. A communication network comprising:

a satellite having a scanning antenna for transmission and/or reception of at least one beam in a tracking direction of said scanning antenna and exhibiting a particular nominal coverage zone centered on said tracking direction, wherein said particular nominal coverage zone is one of a plurality of nominal coverage zones;

a mechanism for synchronizing a scanning operation of said scanning antenna with data packets transmitted or received by said scanning antenna;

a switching mechanism designed to aim said beam sequentially in a plurality of different directions of transmission or reception of said data packets, wherein said beam is aimed in synchronism with said transmission or reception of at least some of said data packets; and a plurality of ground transmission or receiving devices positioned in said particular nominal coverage zone, wherein said plurality of different directions are chosen to ensure that any ground transmission and/or receiving device of said plurality of transmission and/or receiving devices are synchronized with data packets transmitted by said scanning antenna when said any ground transmission and/or receiving device is not receiving said data packets, or that said scanning antenna maintains synchronization with each of of said ground transmission and/or receiving devices when said scanning antenna is receiving said data packets from said any ground transmission and/or receiving device.

8. A device for implementing the procedure according to claim 1, comprising:

a central modulation-management unit incorporating an external angular scanning and packet-synchronization bus;

at least N modulation-control devices;

at least one beam-forming device; and at least one network comprising M antenna elements, wherein said central modulation-management unit incorporates N first terminals connected respectively to N second terminals of said beam-forming device through said N modulation-control devices, and wherein said beam-forming device incorporates M third terminals connected respectively to said M antenna elements and a scanning and synchronization terminal connected to said external angular scanning and packet-synchronization bus.

9. The device according to claim 8, wherein said beam-forming device comprises a wide-band, high-speed beam-forming network and a Butler half-matrix connecting said beam-forming device and said M antenna elements.

10. A device for implementing the procedure according to claim 1, comprising:

a central modulation-management unit incorporating an external angular scanning and packet-synchronization bus;

N' groups of elements in series which comprise:
a modulation control mechanism;
a beam-forming device;
a group of P' power amplifiers;
a Butler matrix; and
a subgroup ($MOD_1, \ldots MOD_{N'}$) of P antenna elements, wherein said modulation control mechanism has a terminal connected to a terminal on the central modulation-management unit and said beam-forming device has a terminal connected to said external angular scanning and packet-synchronization bus, and further comprising a reflector working in conjunction with said N' subgroups of P antenna elements in order to produce focused scanning.

11. The procedure according to claim 2, wherein an angle of tracking shift of said beam between two nominal coverage zones is not greater than $H \times ((F/12)^{1/2} - 0.5)$, wherein F= a maximum dynamic range in dB(P) and H= a width of said beam (in degrees) at medium power.

12. The procedure according to claim 3, wherein an angle of tracking shift of said beam between two nominal coverage zones is not greater than $H \times ((F/12)^{1/2} - 0.5)$, wherein F= a maximum dynamic range in dB(P) and H= a width of said beam (in degrees) at medium power.

13. A device for implementing the procedure according to claim 5, wherein said device comprises:

a central modulation-management unit incorporating an external angular scanning and packet-synchronization bus;

at least N modulation-control devices;

at least one beam-forming device; and at least one network comprising M antenna elements, wherein said central modulation-management unit incorporates N first terminals connected respectively to N second terminals of said beam-forming device through said N modulation-control devices, and wherein said beam-forming device incorporates M third terminals connected respectively to said M antenna elements and a scanning and synchronization terminal connected to said external angular scanning and packet-synchronization bus.

14. A device for implementing the procedure according to claim 5, wherein said device comprises:

a central modulation-management unit incorporating an external angular scanning and packet-synchronization bus;

N' groups of elements in series which comprise:
a modulation control mechanism;
a beam-forming device;
a group of P' power amplifiers;
a Butler matrix; and
a subgroup ($MOD_1, \ldots MOD_{N'}$) of P antenna elements, wherein said modulation control mechanism has a terminal connected to a terminal on the central modulation-management unit and said beam-forming device has a terminal connected to said external angular scanning and packet-synchronization bus, and further comprising a reflector working in conjunction with said N' subgroups of P antenna elements in order to produce focused scanning.

15. The procedure of claim 1, wherein said step of synchronizing said scanning operation occurs with data packets transmitted and received by said scanning antenna.

16. The procedure of claim 1, wherein:

a) said any receiving station in said nominal synchronization zone can receive said at least some of said data packets transmitted by said scanning antenna when said any receiving station is located in said particular nominal coverage zone and such that synchronization between said any receiving station and said reception of said at least some of said data packets is maintained when said any receiving station is located in said nominal synchronization zone but is not receiving said at least some of said data packets; and b) said any transmitting station, which is located in said nominal synchronization zone, is capable of transmitting said at least some of said data packets to said scanning antenna and said scanning antenna is capable of receiving said at least some of said data packets transmitted by said any transmitting station when said any transmitting station is located in said particular nominal coverage zone and such that synchronization between said any transmitting station and said transmission of said at least some of said data packets is maintained when said any transmitting station is located in said nominal synchronization zone but is not transmitting said at least some of said data packets.

17. The communications network of claim 6, wherein:

a) said any receiving station in said nominal synchronization zone can receive said at least some of said data packets transmitted by said scanning antenna when said any receiving station is located in said particular nominal coverage zone and such that synchronization between said any receiving station and said reception of said at least some of said data packets is maintained when said any receiving station is located in said nominal synchronization zone but is not receiving said at least some of said data packets; and b) said any transmitting station, which is located in said nominal synchronization zone, is capable of transmitting said at least some of said data packets to said scanning antenna and said scanning antenna is capable of receiving said at least some of said data packets transmitted by said any transmitting station when said any transmitting station is located in said particular nominal coverage zone and such that synchronization between said any transmitting station and said transmission of said at least some of said data packets is maintained when said any transmitting station is located in said nominal synchronization zone but is not transmitting said at least some of said data packets.

* * * * *